Feb. 13, 1951     C. X. HOSFORD     2,541,922
INCIDENCE ANGLE ADJUSTMENT FOR AIRCRAFT WINGS
Filed Aug. 7, 1948
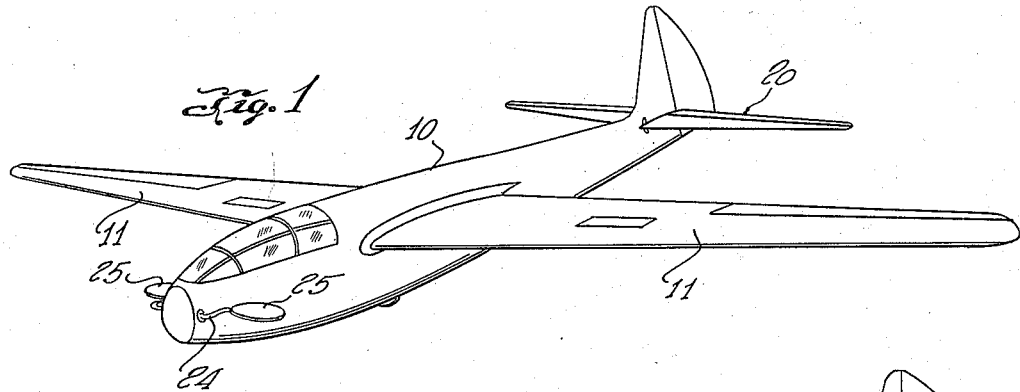
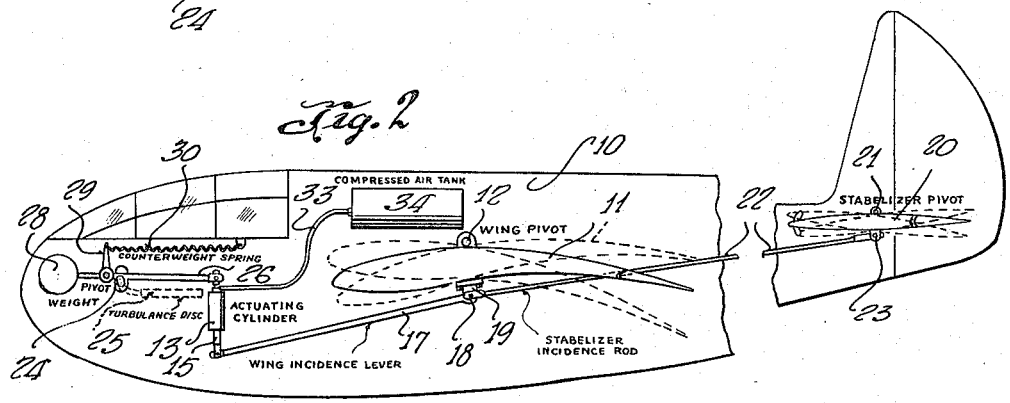
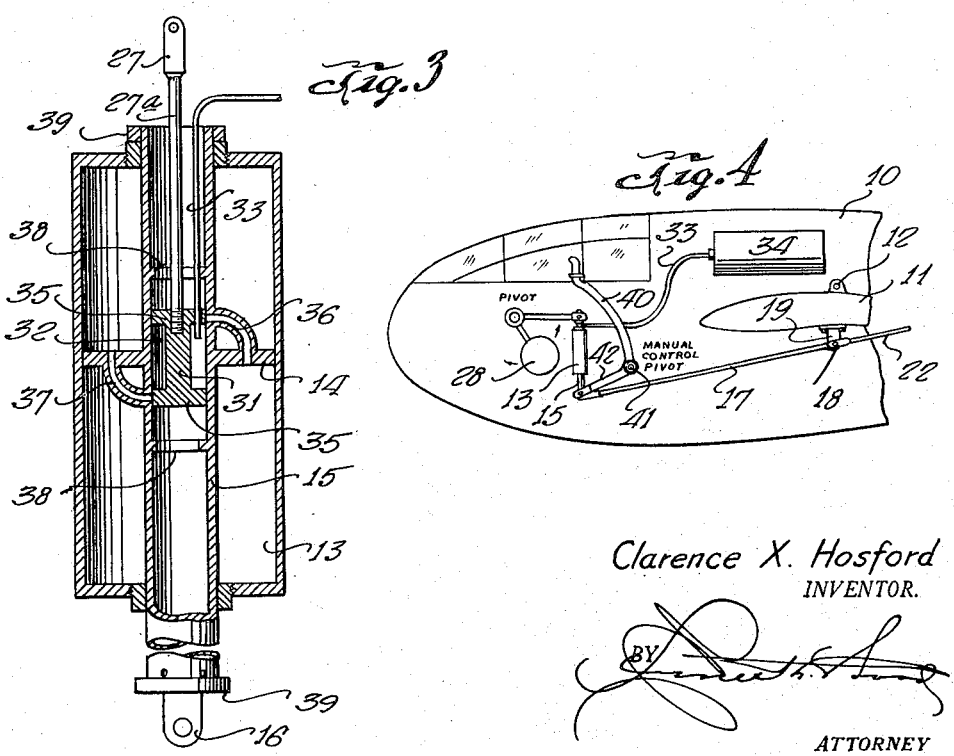
Clarence X. Hosford
INVENTOR.
BY
ATTORNEY Patented Feb. 13, 1951

2,541,922

UNITED STATES PATENT OFFICE 2,541,922

INCIDENCE ANGLE ADJUSTMENT FOR AIRCRAFT WINGS

Clarence X. Hosford, Red Oak, Tex.

Application August 7, 1948, Serial No. 43,100

5 Claims. (Cl. 244—82)

This invention relates to aircraft and more particularly to incidence angle adjusting means for aircraft, especially gliders.

The principal object of the invention is to improve upon devices hitherto employed for increasing the maximum lift coefficient of winged aircraft, particularly gliders, by pivoting the wings for limited rotation about their major axes and providing mechanism actuated by air turbulence to accomplish this, that is to say, when the craft encounters rising air currents the mechanism is actuated thereby to elevate the leading edge of the wings to increase the lift thereof resulting in greater altitude. Simultaneously, the elevators are similarly actuated to stabilize the craft.

Another object of the invention is to provide equipment for motorless aircraft adapted to soar by seeking out vagrant air currents tending to maintain the craft in flight, such equipment including a turbulence foil adapted to actuate a piston in a cylinder, thus displacing a valve effective to release air under pressure into the cylinder from a compression drum, the air thus released exerting an upward force against the piston and causing the leading edge of the wings of the craft to be elevated through a plunger connected to the piston and a lever forming a connection between the plunger and wing assembly.

Another object of the invention is to provide a counterbalancing weight so connected to the turbulence foil as to minimize the shock which would otherwise be transmitted to the craft upon impact of velocity air currents with the turbulence foil, thus having the effect to restore the craft to equilibrium following the disturbance thereof. Moreover, the weight which is itself counterbalanced or stabilized by spring action, tends to maintain normal level flight of the craft until the latter is again influenced upwardly by rising air currents.

Still another object of the invention is to provide a valve-in-piston assembly which is actuated by and cooperates with the weight and turbulence foil to control ingress and egress of air under pressure on either side of the piston in the cylinder and thus bring about automatic stabilization of the craft in flight, yet responding to rising air currents to change the incidence angle of the wings and increase their lifting power upon encountering such currents and thus increase the altitude of the craft.

With the foregoing objects in view, the invention has further reference to certain features of accomplishment which will become apparent as the description proceeds, taken in connection with the accompanying drawings wherein:

Figure 1 is a perspective view of an aircraft showing the position of the turbulence foils thereon.

Figure 2 is a schematic view showing the relative positions of the parts of the invention in an aircraft.

Figure 3 is a view in vertical section of the piston, cylinder and valve, and

Figure 4 is a schematic view of a modified form of the invention in which a manually actuated lever is incorporated for changing the wing incidence.

Continuing with a more detailed description of the drawing, reference numeral 10 denotes the fuselage and 11 the wings of an aircraft, particularly a glider. The drawing is more or less schematic and the craft is shown in outline so that the general disposition of parts may be disclosed. The wings 11 are each connected to the fuselage by a suitable form of pivot at 12 and other such bracing means, not shown, as may be necessary to insure adequate stability. The particular position of the pivots provide for oscillation of the wings on a horizontal axis.

Disposed at a suitable point in relation to the wings is a cylinder 13. This cylinder is stationary and contains a piston 14 (Figure 3) which is fixed to a hollow plunger 15 which is displaceable longitudinally in the cylinder. To the lower end 16 of the plunger is pivotally connected one end of a wing incidence lever 17. The opposite end of the lever 17 is rigidly attached at 18 to a bracket 19 under the wing 11. It is obvious therefore that when the plunger 15 is moved downwardly, the thrust on the lever 17 will be effective to tilt the leading edge of the wing downwardly. Conversely, upward movement of the plunger will raise the leading edge of the wing, causing the craft to increase its altitude. Simultaneously, the stabilizers 20 which are pivoted at 21 are similarly actuated by means of a stabilizer incidence rod 22, one end of which is connected to a bracket 23 affixed to the underside of the stabilizer and whose opposite end is connected to the bracket 19 under the wing 11.

In the nose of the craft is journaled a crank arm 24 and to each outer end of the crank arm is affixed an air turbulence disc 25, in Figures 1 and 2. Rigidly secured to the crank arm 24 is a rod 23, one end of which is pivoted to the upper end 27 of a valve actuating rod 27a. To the opposite end of the rod 26, which extends beyond the crank arm 24 is affixed a weight 28. An arm 29 is rigidly secured to and extends upwardly from the crank arm 24 to this arm 29 is attached one end of a coil spring 30, the opposite end of the spring being secured to a stationary part of the fuselage. The weight 28 has the effect to reduce to a negligible degree the shock which would otherwise be transmitted to the craft through the turbulence foils 25 when the latter are subjected to violent impact of rising air currents and tends, with the cooperation of the counterbalancing spring 30, to stabilize the craft in flight.

From the foregoing it is evident that when the soaring craft encounters a rising air current, force of impact of the latter against the turbulence foils 25 will cause these foils to exert torque on the crank arm 24 to move the plunger 15 upwardly in the cylinder 13 through the rod 26, thus changing the incidence of the wings 11 for increased altitude. The weight 28, counterbalanced by the spring 30 has a stabilizing effect to prohibit too rapid displacement of the turbulence discs 25 and to restore equilibrium of the craft.

Cooperating with the turbulence discs or foils 25 to actuate the plunger 15 is a valve 31 reciprocably arranged in the hollow plunger 15. This valve is fashioned with an annular chamber 32 about its midsection and into this chamber extends the end of a flexible air line 33, connected with a compressed air tank 34. When the valve 31 is in the neutral position shown, the end flanges 35 thereof are positioned to close an air passage 36 effecting communication between the chamber 32 and the cylinder 13 below the piston 14 as well as the passage 37 which provides communication between the valve chamber 32 and the cylinder above the piston.

The valve 31 is mounted on the lower end of the valve actuating rod 27a and is actuated thereby but is limited in its travel by stops 38 within the hollow plunger 15. Collars 39 at each end of the plunger 15 limit its displacement in the cylinder 13 and consequently that of the piston 14 which is attached thereto or a part thereof.

In operation, rapidly ascending air currents impinging the turbulence foils 25 will actuate the crank arm 24 to raise the valve 31 through the rods 26 and 27a. The valve, in moving upwardly, will open passage 36 permitting air under pressure from tank 34 to enter the cylinder 13 below the piston 14 through the flexible line 33. The piston will be moved upwardly to raise the plunger 15, resulting in the upward tilting of the wing 11 on its pivot 12. Raising of the leading edge of the wing will cause the draft to ascend under influence of the rising air currents. The stabilizers are similarly actuated through the rod 22.

The craft continues to increase its altitude until the lifting air currents are expended, after which the spring 30, overcoming the counterweight 28, will return the valve 31 to neutral position followed by a return of the piston 15 to the new position of the valve, thus shutting off air to the cylinder whereupon the wing 11 and stabilizers will resume position for level flight.

In Figure 4 is shown an identical arrangement to that described except that a manual control lever 40 is substituted for the air turbulence foils 25. This lever is mounted on a shaft 41 and actuates an arm 42 which latter, in turn, operates the plunger 15 to move the valve 31 in relation to passages 36 and 37. The result is a change in the wing incidence through air under pressure from tank 34 entering the cylinder 15 to displace the piston 31, causing movement of the incidence lever to change the angle of the wings 11. As in the preceding case, the weight 28 has the effect to stabilize the craft and return equilibrium thereof after disturbance.

It is evident from the foregoing that the broad intent of the invention is to so equip a heavier-than-air craft, particularly a glider, that full advantage may be taken of updrafts of air and this may, in some cases, be accomplished to the exclusion of all of the described mechanism except the pivoted wings and the weight so connected with the wings that it will exert a tilting force effective to increase the incidence angle when the craft encounters an updraft and thus obtain longer periods of sustained flight. The cylinder 13 and its plunger, as well as the compressed air tank 34 are shown to illustrate one form of means for tilting the wings on their longitudinal axes or even sections of wings on like axes in the form of flaps and may be substituted by equivalent means performing the same or similar functions.

Manifestly, the construction as shown and described is capable of some modification and such modification as may be construed to fall within the scope and meaning of the appended claims is also considered to be within the spirit and intent of the invention.

What is claimed is:

1. A wing incidence control for motorless aircraft comprising in combination with sustaining wings pivoted to the fuselage of the aircraft for oscillation about the longitudinal axis of said wings, a cylinder having a hollow plunger reciprocable therein, a piston on said plunger, a lever pivotally connected at one end to the lower end of said plunger and fixed at its opposite end to the underside of one of said wings of said aircraft for pivotally displacing said wing about its longitudinal axis, a pair of air turbulence foils, a crank on which said foils are mounted on each side of said fuselage and adapted to be rotated when said foils are actuated by rising air currents, a valve in said hollow plunger connected to said crank and adapted to be moved when said air turbulence foils are actuated, means for introducing air under pressure into said cylinder effective to displace said plunger to change the incidence of said wings when said valve is actuated by said turbulence foils and means for stabilizing said control.

2. In a glider, a pair of wings pivoted to the fuselage of said glider for oscillation about their longitudinal axes, a cylinder having a piston therein, a hollow plunger reciprocable with said piston in said cylinder, a lever pivoted at one end to the lower end of said plunger and fixed at its opposite end to the underside of a wing of said pair of wings to oscillate said wing about its axis, an air foil actuated by air turbulence, a crank on which said foil is mounted and actuated thereby, a valve in said plunger, means connecting said crank and valve to effect movement of the latter when said air foil is actuated, means for introducing air under pressure into said cylinder when said valve is actuated to move said piston and plunger to actuate said wing and means for restoring said wings to normal position for level flight.

3. In a glider, wings pivoted to said glider for oscillation about their longitudinal axes, a cylinder having a piston therein, a hollow plunger operated in said cylinder by said piston, a wing incidence lever pivotally connected at one end to the lower end of said plunger, means for fixedly securing the opposite end of said lever to the underside of one of said wings, an air turbulence foil on each side of said glider, a crank arm on which said foils are mounted and adapted to be moved when said foil is actuated by air currents, means connecting said crank arm to said valve to actuate the latter, means for introducing air under pressure into said cylinder to actuate said piston when said valve is actuated to move said plunger and thereby change the angle of incidence of said wing and means for restoring equilibrium to said glider when disturbed.

4. In a glider, wings pivoted to said glider intermediate their fore and aft edges for oscillation about their longitudinal axes, a cylinder having a piston therein, a hollow plunger affixed to said piston and reciprocable thereby in said cylinder, an incidence lever pivotally connected at one end to the lower end of said plunger and affixed at its opposite end to one of said wings of said glider to change the angle of incidence of the wing when said plunger is actuated, a turbulence foil on each side of said glider, a crank oscillated by said foils when the latter are subjected to air currents moving perpendicular thereto, a valve in said hollow plunger, means connecting said valve and crank, means for introducing air under pressure into said cylinder when said valve is actuated to effect displacement of said piston and plunger in said cylinder and counterbalanced means adapted to be displaced counter to vertical movements of said glider to stabilize said valve and to restore disturbed equilibrium of said glider.

5. In a glider, a wing pivoted to said glider for oscillation about its longitudinal axis, a cylinder, a plunger movable in said cylinder transverse to said wing axis and having connection with said wing to oscillate the same, a crank shaft, an air turbulence foil mounted on each end of said crank shaft and effective to oscillate the latter when impinged by air currents moving perpendicular thereto, a valve in said plunger, means connecting said shaft and said valve and means for introducing air under pressure into said cylinder when said valve is actuated to effect displacement of said plunger to change the incidence of said wing.

CLARENCE X. HOSFORD.

REFERENCES CITED

The following references are of record in the file of this patent:

UNITED STATES PATENTS

| Number | Name | Date |
|--------|------|------|
| 1,365,347 | Schneider | Jan. 11, 1921 |
| 1,818,044 | Constantin | Aug. 11, 1931 |
| 1,895,679 | McPherson | Jan. 31, 1933 |
| 1,935,824 | Upson | Nov. 21, 1933 |
| 2,395,671 | Kleinhans | Feb. 26, 1946 |

FOREIGN PATENTS

| Number | Country | Date |
|--------|---------|------|
| 407,289 | France | Dec. 24, 1909 |